US010057202B2

(12) United States Patent
Liu et al.

(10) Patent No.: US 10,057,202 B2
(45) **Date of Patent: *Aug. 21, 2018**

(54) PERSONAL COMMUNICATION DATA MANAGEMENT IN MULTILINGUAL MOBILE DEVICE

(71) Applicant: International Business Machines Corporation, Armonk, NY (US)

(72) Inventors: Su Liu, Austin, TX (US); Michael S. Ly, Austin, TX (US); Robert K. Sloan, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 14/730,361

(22) Filed: Jun. 4, 2015

(65) Prior Publication Data

US 2016/0241506 A1 Aug. 18, 2016

Related U.S. Application Data

(63) Continuation of application No. 14/622,058, filed on Feb. 13, 2015.

(51) Int. Cl.
*H04L 12/58* (2006.01)

(52) U.S. Cl.
CPC ............ *H04L 51/16* (2013.01); *H04L 51/066* (2013.01); *H04L 51/36* (2013.01)

(58) Field of Classification Search
CPC ....... H04L 51/066; H04L 51/16; H04L 51/36; H04L 12/589

(Continued)

(56) References Cited

U.S. PATENT DOCUMENTS 5,351,129 A * 9/1994 Lai ........................ H04N 5/2624 345/634
6,279,015 B1 * 8/2001 Fong ................. G06F 17/30607 715/239

(Continued)

FOREIGN PATENT DOCUMENTS

CN 101155049 A 4/2008
CN 103167172 A 6/2013

(Continued)

OTHER PUBLICATIONS

International Searching Authority, "Notification of Transmittal of the International Search Report and the Written Opinion of the International Searching Authority, or the Declaration," Patent Cooperation Treaty, dated May 17, 2016, 12 Pages, International Application No. PCT/IB2016/050223.

(Continued)

*Primary Examiner* — Kevin Bates
*Assistant Examiner* — Chen-Liang Huang
(74) *Attorney, Agent, or Firm* — Reza Sarbakhsh

(57) ABSTRACT

A method for managing personal communication data, wherein the personal communication data including a plurality of chat histories from a plurality of chat applications is provided. The method may include converting a first chat history from a first application and a second chat history from a second application into an integrated unified format, whereby the second application is different from the first application. The method may also include storing the integrated unified format into an indexed storage. The method may further include providing a user interface (UI) to access the integrated unified format via the indexed storage.

6 Claims, 8 Drawing Sheets

500, 416, 502, 430A, 418, 504, 506, 508, 510, 512, 514, 516, 518, 520, 522, 524, 526, 528, 530, 532, 112

(58) Field of Classification Search
USPC .......................................................... 715/758
See application file for complete search history.

(56) References Cited

U.S. PATENT DOCUMENTS 7,013,263 B1 3/2006 Isaka et al.
7,499,926 B1 3/2009 Burckart et al.
8,135,343 B2 3/2012 Kuroda et al.
8,428,228 B1 * 4/2013 Baxter, Jr. ............. G06Q 10/10 379/142.14
8,626,832 B2 1/2014 Jerrard-Dunne et al.
8,639,762 B2 1/2014 Rasmussen et al.
8,819,145 B1 * 8/2014 Gailloux ................. H04L 51/36 455/412.1
2002/0083181 A1 * 6/2002 Decime ................ G06Q 10/107 709/230
2003/0167253 A1 * 9/2003 Meinig ............. G06F 17/30303
2004/0078446 A1 4/2004 Daniell et al.
2004/0087273 A1 * 5/2004 Perttila ................. G01S 13/751 455/41.2
2007/0135099 A1 * 6/2007 Taylor ................. G06F 17/3089 455/412.1
2007/0260681 A1 11/2007 Jacovi et al.
2008/0207233 A1 8/2008 Waytena et al.
2009/0316692 A1 12/2009 Trapp et al.
2011/0145064 A1 * 6/2011 Anderson ............. G06Q 30/02 705/14.53
2013/0204888 A1 8/2013 Guzman Suarez et al.
2016/0147853 A1 * 5/2016 Golobrodsky ........ G10L 15/005 707/756
2016/0171505 A1 * 6/2016 Johri .................... G06Q 30/016 705/7.11
2016/0241501 A1 8/2016 Liu et al.
2017/0126594 A1 * 5/2017 Chudge ................. H04L 51/043

FOREIGN PATENT DOCUMENTS

JP 2008219461 A 9/2008
JP 5257253 B2 8/2013
WO 2012166985 A1 12/2012
WO 2016128848 A1 8/2016

OTHER PUBLICATIONS

IBM, "List of IBM Patents or Patent Applications Treated as Related (Appendix P)," dated Jun. 4, 2015, p. 1-2.

Liu et al., "Personal Communication Data Management in Multilingual Mobile Device," Filed on Feb. 13, 2015, p. 1-36, U.S. Appl. No. 14/622,058.

Mell et al., "The NIST Definition of Cloud Computing," National Institute of Standards and Technology, Information Technology Laboratory, Oct. 7, 2009, Version 15.

Wechat, "The new way to connect," WeChat Home, 2014, p. 1-2, Tencent Inc., http://www.wechat.com/en/, Accessed on Feb. 11, 2015.

Wikipedia, "List of countries by number of mobile phones in use," Wikipedia: the Free Encyclopedia, Last Modified on Feb. 8, 2015, p. 1-10, http://en.wikipedia.org/wiki/List_of_countries_by_number_of mobile_phones_in_use, Accessed on Feb. 11, 2015.

* cited by examiner

PERSONAL COMMUNICATION DATA MANAGEMENT IN MULTILINGUAL MOBILE DEVICE

BACKGROUND

The present invention relates generally to the field of computers, and more particularly to personal communication data management.

Currently, there are more than 6 billion mobile phone subscriptions in the world. Personal communication services (PCSs) and personal communication applications (PCAs), such as instant messaging applications and chat applications, are part of the most popular categories for use on mobile devices. Most mobile users may have more than one PCA installed on their mobile device and may use multiple PCS s simultaneously to chat with different friends or groups. Additionally, many mobile phone users may chat with friends in different groups or countries with different languages.

SUMMARY

According to one embodiment, a method for managing personal communication data, wherein the personal communication data comprises a plurality of chat histories from a plurality of chat applications is provided. The method may include converting a first chat history from a first application and a second chat history from a second application into an integrated unified format, whereby the second application is different from the first application. The method may also include storing the integrated unified format into an indexed storage. The method may further include providing a user interface (UI) to access the integrated unified format via the indexed storage.

According to another embodiment, a computer system for managing personal communication data, wherein the personal communication data comprises a plurality of chat histories from a plurality of chat applications is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include recording a plurality of communication outputs of at least two users engaged in a remote message exchange or a remote conversation. The method may include converting a first chat history from a first application and a second chat history from a second application into an integrated unified format, whereby the second application is different from the first application. The method may also include storing the integrated unified format into an indexed storage. The method may further include providing a user interface (UI) to access the integrated unified format via the indexed storage.

According to yet another embodiment, a computer program product for managing personal communication data, wherein the personal communication data comprises a plurality of chat histories from a plurality of chat applications is provided. The computer program product may include one or more computer-readable storage devices and program instructions stored on at least one of the one or me tangible storage devices, the program instructions executable by a processor. The computer program product may include program instructions to convert a first chat history from a first application and a second chat history from a second application into an integrated unified format, whereby the second application is different from the first application. The computer program product may also include program instructions to store the integrated unified format into an indexed storage. The computer program product may further include program instructions to provide a user interface (UI) to access the integrated unified format via the indexed storage.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
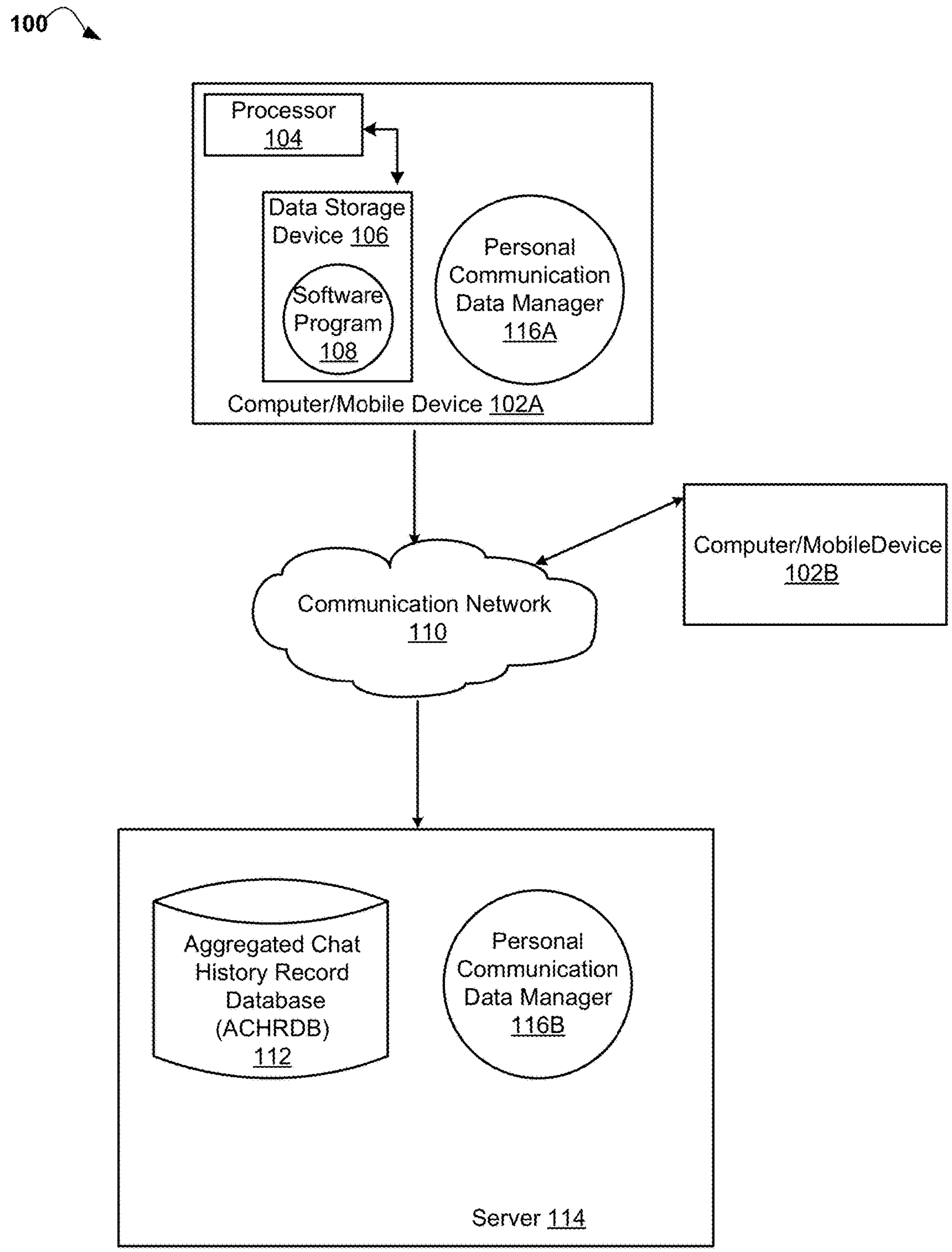
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to personal communication data management. The following described exemplary embodiments provide a system, method and program product to, among other things, to manage personal communication data in a multilingual mobile device. Therefore, the present embodiment has the capacity to improve the technical field of personal communication data management by providing the capability to manage all multilingual chat history records in different PCAs. More specifically, a user of a multilingual mobile device may manage and search all chat history records crossing applications in the mobile device.

As previously described, personal communication service (PCS) and personal communication application (PCA), such as instant messaging and chat applications, are part of the most popular categories for use on mobile devices. Most mobile users may have more than one PCA installed on their mobile device and may use multiple PCS s simultaneously to chat with different friends or groups. Additionally, many mobile phone users may chat with friends in different groups or countries with different languages. For example, there are more than 700 million users on Wechat® (Wechat® and all Wechat®—based trademarks and logos are trademarks or registered trademarks of Tencent Holdings Limited and/or its affiliates), a popular PCA used in over 100 countries in over 15 languages. Wechat® is a mobile text and voice messaging communication service. It is currently the largest standalone messaging application by monthly active users. There are more than 23000 new Wechat® users every day. A study shows that average Wechat® weekly hours are 12 hours per user.

Additionally, in QQ® (QQ® and all QQ®—based trademarks and logos are trademarks or registered trademarks of Tencent Holdings Limited and/or its affiliates), another one of the most popular personal communication PCAs, there are more 550 million active users. QQ® is s an instant messaging software service. QQ® provides a variety of services, including online social games, music, shopping, microblogging, and group and voice chat.

Currently, most users are using more than two different personal communication PCAs in their own mobile device in order to keep connected with their contacts. For example, a user may be using two chat applications, such as Wechat® and QQ®, to chat with different friends at the same time. Many PCAs provide a history search feature to allow users to retrieve a chat history. However, one of the largest limitations is that a user does not have the capability to search the chat history records which have occurred in other PCAs. For example, it may be inconvenient to locate personal chat histories from across different applications. This limitation may be due to the fact that there is a lack of aggregation methods to deal with the different encoding algorithms, the conflicts of incompatible codeset standards, and the different language settings in different PCAs. As such, it may be advantageous, among other things, to provide a method to manage all multilingual chat history records in different PCAs so that a user may manage and search all chat records from across various applications in a mobile device.

According to at least one implementation, the present embodiment may provide a client based chat history management method for integrating multilingual chat history records in different chat applications. Therefore, a user may manage and retrieve all chat records in different languages which were input from different PCAs. Furthermore, the present embodiment may include a set of key components, such as chat history manager interface (CHMI); a chat content normalizer (CCN); a chat content aggregation agent (CCAA); an aggregated chat history record database (ACHRDB); and a chat content search engine (CCSE). As such, according to various implementations of the present embodiment, three major personal communication manipulations may be improved and provided in a mobile device: 1) monitoring and tracking personal chat records; 2) normalizing different personal communication contents from different applications; and 3) retrieving the chat records.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide a product recommendation to manage personal communication data in a multilingual device.

According to at least one implementation, the present embodiment may allow a user to manage separate chat histories in separate chat applications in a multilingual enabled mobile device. As such, the present embodiment may decode and convert each chat history record into a unified format. Then, each chat history record may be indexed with detected language tags and an application ID. All the tagged chat history records may then be integrated/aggregated into a single storage allowing the user to manage the integrated tagged history records in one user interface.

Referring to FIG. 1, an exemplary networked computer environment 100 in accordance with one embodiment is depicted. The networked computer environment 100 may include a computer 102A, 102B with a processor 104 and a data storage device 106 that is enabled to run a software program 108 and a Personal Communication Data Manager 116A. The networked computer environment 100 may also include a server 114 that is enabled to run a Personal Communication Data Manager 116B that interacts with an Aggregated Chat History Record Database (ACHRDB) 112 and a communication network 110. The Aggregated Chat History Record Database (ACHRDB) 112 may be used to save integrated, normalized, tagged, or sorted chat history records. The networked computer environment 100 may include a plurality of computers 102A, 102B and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102A, 102B may communicate with the Personal Communication Data Manager 116B running on server computer 114 via the communications network 110. The communications network 110 may include connections, such as wire, wireless communication links, or fiber optic cables. As will be discussed with reference to FIG. 6, server computer 114 may include internal components 800*a* and external components 900*a*, respectively, and client computer 102A, 102B may include internal components 800*b* and external components 900*b*, respectively. Client computer 102A, 102B may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Aggregated Chat History Record Database (ACHRDB) 112 may be embedded in various storage devices, such as, but not limited to a mobile device 102A, 102B, a networked server 114, or a cloud storage service.

As previously described, the client computer 102A, 102B may access the Aggregated Chat History Record Database (ACHRDB) 112 or the Personal Communication Data Manager 116B, running on server computer 114 via the communications network 110. For example, a first user using a client computer/mobile device 102A may engage in a conversation (via a particular chat application) with a second user using another client computer/mobile device 102B. However, the first user may later engage in another conversation with the second user using another client computer/mobile device 102B via a different chat application than was used during the first conversation. As previously described, the Personal Communication Data Manager 116A, 116B may assist the user in managing personal communication data in a multilingual mobile device 102A. For example, the Personal Communication Data Manager 116A, 116B may provide a method to manage all multilingual chat history records in different PCAs so that a user may manage and search all chat records from across various applications in a mobile device. The Personal Communication Data Manager method is explained in more detail below with respect to FIGS. 4 and 5.

Figure 2:
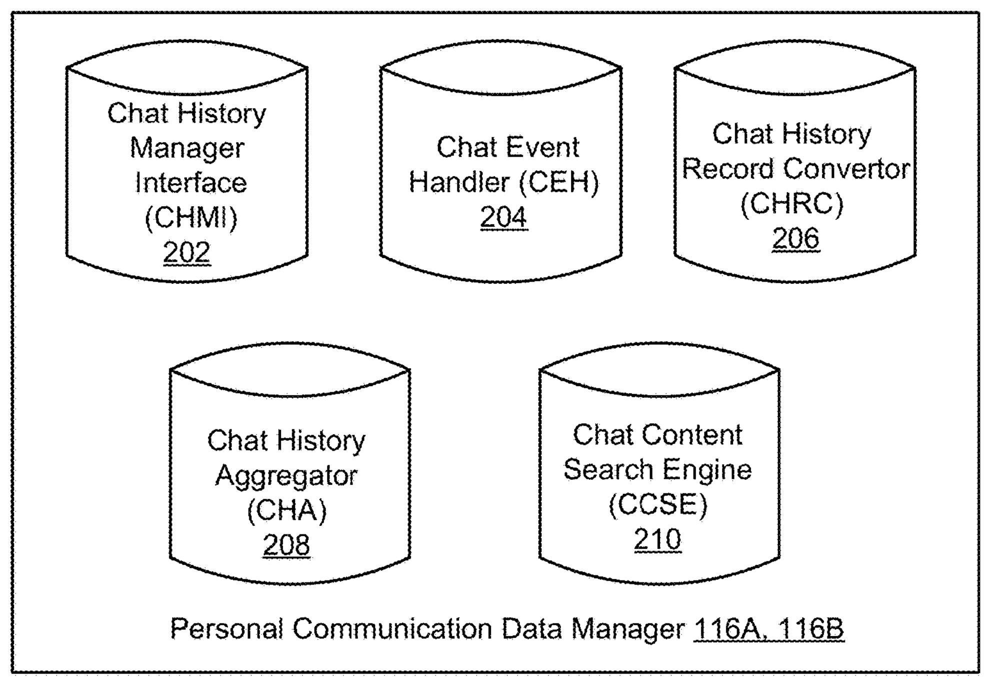
FIG. 2 is an exemplary illustration of the components and algorithms associated with the Personal Communication Data Manager according to at least one embodiment.

Referring now to FIG. 2, an exemplary illustration 200 of the components and algorithms associated with the Personal Communication Data Manager 116A, 116B in accordance with one embodiment is depicted. The Personal Communication Data Manager 116A, 116B may include a Chat History Manager Interface (CHMI) 202. The CHMI 202 is a user interface to manage chat histories in different chat applications. According to at least one implementation of the present embodiment, the user may configure a profile of integrating rules and other pre-defined aggregating configuration settings through the CHMI 202. Additionally, the user may perform other operations, such as manually integrate, update, backup, list, or search chat history records.

The Personal Communication Data Manager 116A, 116B may also include a Chat Event Handler (CEH) 204. The CEH 204 is a daemon that monitors multiple chat events and invokes chat aggregation actions based on the pre-defined integrating settings. Furthermore, a Chat History Record Convertor (CHRC) 206 may also be included. The CHRC 206 is a set of components to normalize separated chat history records. Normalization operations may include: decoding chat contents; unifying code sets; detecting languages used in the contents; removing all standard generalized markup language (SGML) tags as needed; adding a prefix language tag; adding an application tag; and adding other related tags into each record. The Personal Communication Data Manager 116A, 116B may also include a Chat History Aggregator (CHA) 208. The CHA 208 aggregates all normalized chat records into the aggregated chat history record database (ACHRDB) 112 (FIG. 1). Additionally, the Personal Communication Data Manager 116A, 116B may also include a Chat Content Search Engine (CCSE) 210. The CCSE 210 is an enhanced chat history search engine supported by the aggregated chat history record database (ACHRDB) 112 (FIG. 1).

Figure 3:
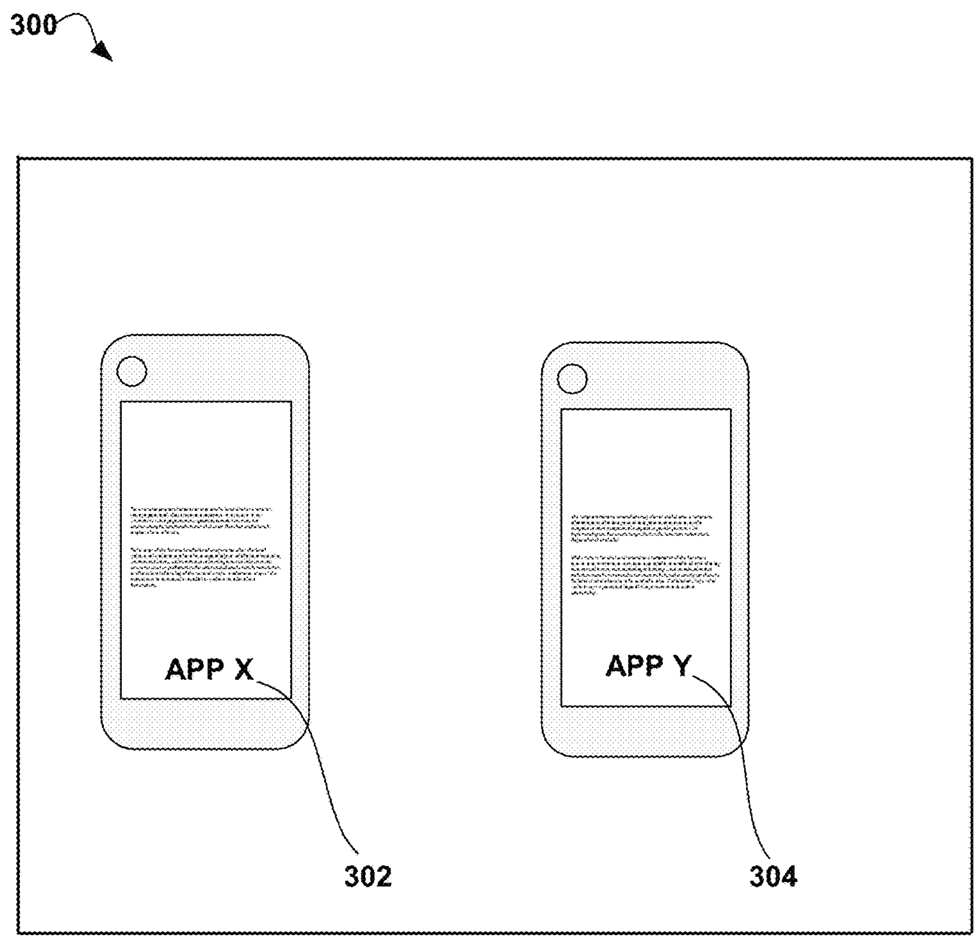
FIG. 3, is an exemplary illustration of a user engaged in multiple chat applications according to at least one embodiment.

Referring now to FIG. 3, an exemplary illustration 300 of a user engaged in multiple chat applications in accordance with one embodiment is depicted. As previously described, it may be common for a user to use two different chat applications, such as chat application APP X 302 (e.g., Wechat®) and chat application APP Y 304 (e.g., QQ®) to chat with different friends during the same time. According to the present embodiment, the Personal Communication Data Manager 116A, 116B (FIG. 1) may provide a history search feature to allow users to retrieve a chat history that has occurred in other PCAs 302, 304. For example, with respect to FIG. 2, a user may be able to locate personal chat histories from APP X 302 while using APP Y 304.

Figure 4:
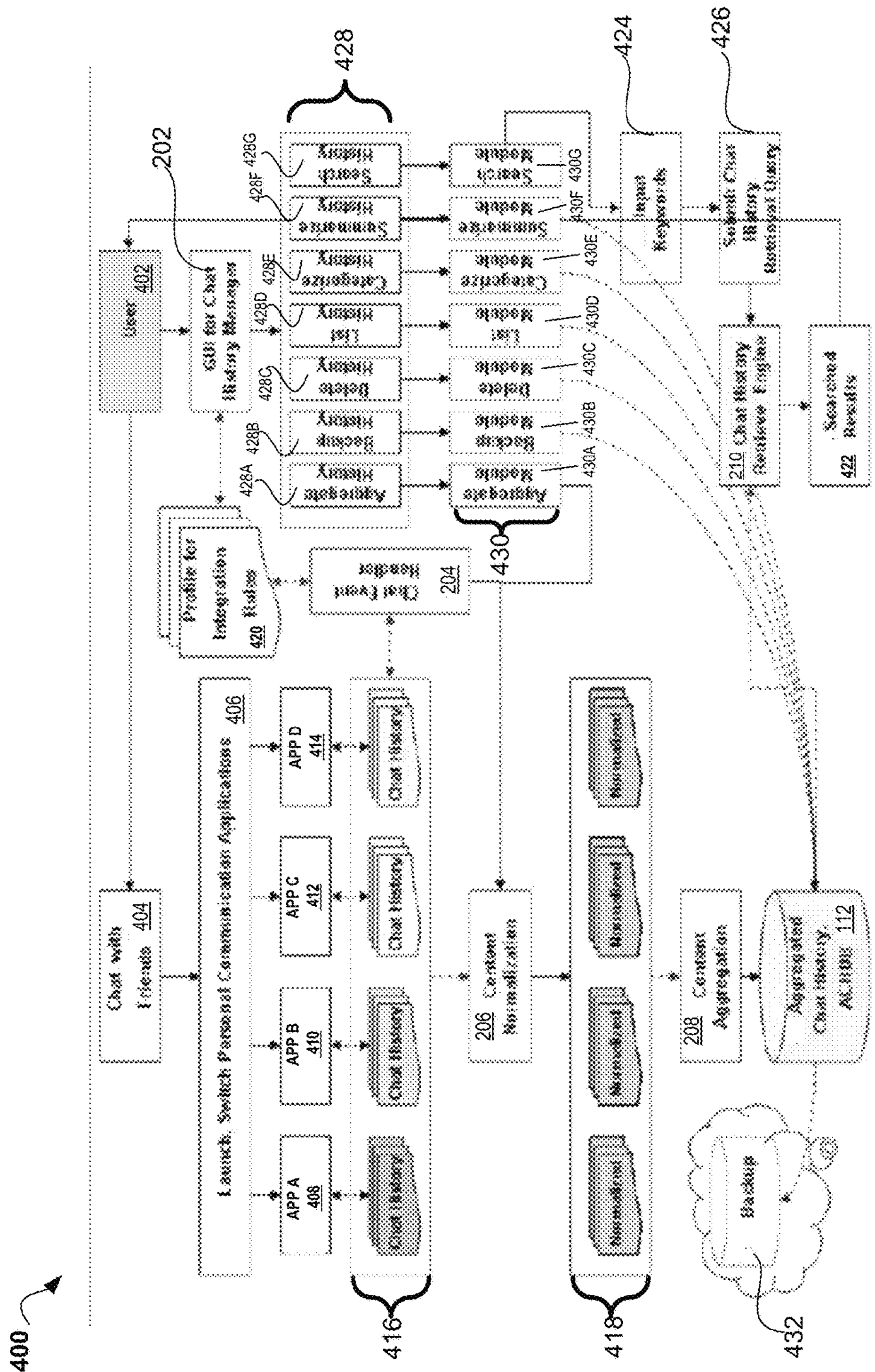
FIG. 4, is an exemplary illustration of a system architecture according to at least one embodiment.

Referring now to FIG. 4, an exemplary illustration of a system architecture 400 in accordance with one embodiment is depicted. According to at least one implementation, the present embodiment may include the following components: a Chat History Manager Interface (CHMI) (i.e., GUI for Chat History Manager) 202; a Chat Event Handler (CEH) 204; an Aggregated Chat History Record Database (ACHRDB) 112; a Chat History Record Convertor (CHRC) 206 (i.e., Content Normalization); a Chat History Aggregator (CHA) 208 (i.e., Content Aggregation); and a Chat Content Search Engine (CCSE) 210 (i.e., Chat History Retrieve Engine).

As such, with respect to FIG. 4, a user 402 may be engaged in multiple conversations with friends 404, after launching 406 multiple personal communication applications (PCAs) 408-414, such as Wechat® or QQ®, where each PCA 408-414 contains its own separate chat history 416. According to one implementation, a Chat History Manager Interface (CHMI) 202 is utilized as a user interface to manage chat histories 416 in different chat applications 408-414. As such, the user may configure a profile of integrating rules 420 and other pre-defined aggregating configuration settings 420 through the CHMI 202. Additionally, the user may perform other operations 428, such as manually integrate, update, backup, list, delete, categorize, summarize, or search chat history records 416 (i.e., Aggregate History 428A; Backup History 428B; Delete History 428C; List History 428D; Categorize History 428E; Summarize History 428F; and a Search History 428G). These operations may be controlled via a set of modules 430, such as an aggregate module 430A, a backup module 430B, a delete module 430C, a list module 430D, a categorize module 430E, a summarize module 430F, and a search module 430G.

Additionally, a Chat Event Handler (CEH) 204 may be invoked. The CEH is a daemon that monitors multiple chat events and invokes chat aggregation actions 428 based on the pre-defined integrating settings 420. Various implementations of the present embodiment may include an Aggregated Chat History Record Database (ACHRDB) 112. The ACHRDB 112 is a storage repository that may be backed up to cloud storage 432. The ACHRDB 112 may be used to save integrated, normalized, tagged, and sorted chat history records 416.

Furthermore, a Chat History Record Convertor (CHRC) 206 may also be included. The CHRC 206 is a set of components to normalize separated chat history records 416 as normalized chat history records 418. Normalization operations may include: decoding chat contents; unifying code sets; detecting languages used in the contents; removing all standard generalized markup language (SGML) tags as needed; adding a prefix language tag; adding an application tag; and adding other related tags into each record. Also, a Chat History Aggregator (CHA) 208 may be utilized to aggregate all normalized chat records 416 into the aggregated chat history record database (ACHRDB) 112. The Chat Content Search Engine (CCSE) 210 is an enhanced chat history search engine supported by the aggregated chat history record database (ACHRDB) 112 that may retrieve chat histories 416 based on input keywords 424. For example, after input keywords 424 are entered by a user 402, the Personal Communication Data Manager 116A, 116B (FIG. 1) may submit a chat history retrieval query 426 to the CCSE 210. Then, the CCSE 210 may retrieve chat histories 416 based on the input keywords 424 and provide searched results 422 to the user.

Figure 5:
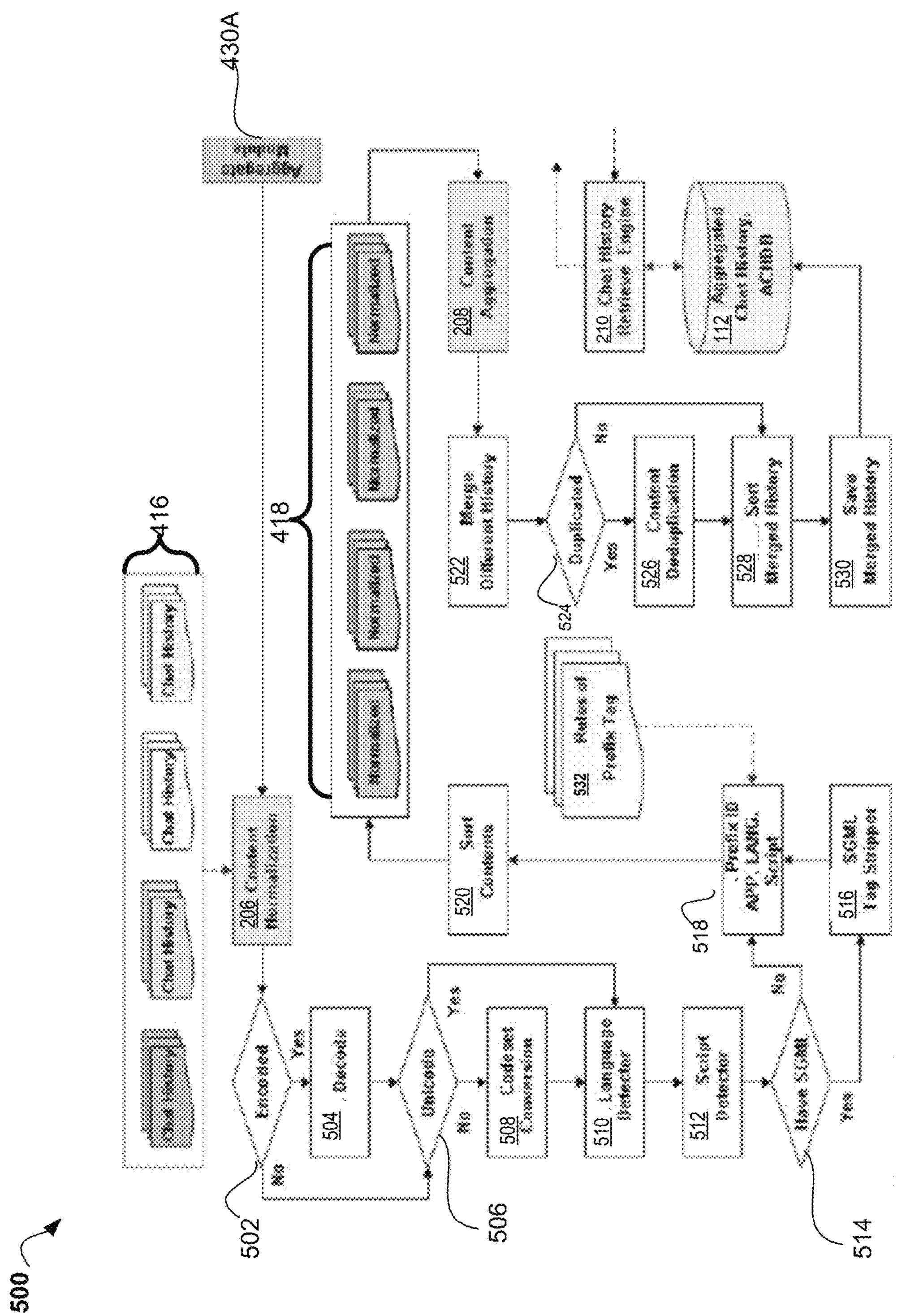
FIG. 5 is an operational flowchart illustrating the steps carried out by a program for managing personal communication data in a multilingual mobile device according to at least one embodiment.

Referring now to FIG. 5, an operational flowchart 500 illustrating the steps carried out by a program for managing personal communication data in a multilingual mobile device according to at least one embodiment is depicted. As previously described, the present embodiment may provide the capability for a user to manage all multilingual chat history records that were created in different PCAs. As such, the user may manage and search all chat records from across various applications in a multilingual mobile device 102A, 102B (FIG. 1).

At 502, the method will determine whether chat histories 416 are encoded. As such, the content of chat histories 416 (from various PCAs 408-414 (FIG. 4)) are normalized by the Chat History Record Convertor (CHRC) 206 and the Aggregate Module 430A. As previously described, the CHRC 206 is a set of components to normalize separated chat history records 416. As such, the CHRC 206 may convert a first chat history from a first application and a second chat history from a second application into an integrated unified format (i.e., converting the first chat history and second chat history into the same format via the normalization process), whereby the second application is different than the first application. Normalization operations may include: decoding chat contents; unifying code sets; detecting languages used in the contents; removing all standard generalized markup language (SGML) tags as needed; adding a prefix language tag; adding an application tag; and adding other related tags into each record.

If at 502 it is determined that the chat histories 416 are encoded, then at 504, the content of the encoded chat histories 416 will be decoded. Then at 506, it is determined whether the chat histories 416 are in Unicode. Unicode is a computing industry standard for the consistent encoding, representation, and handling of text expressed in most of the world's writing systems. More specifically, Unicode is an international encoding standard for use with different languages and scripts, by which each letter, digit, or symbol is assigned a unique numeric value that applies across different platforms and programs. As such, if at 502 it is determined that the chat histories 416 are not encoded, then the method will proceed directly to step 506 to determine whether the chat histories 416 are in Unicode.

If at 506 it is determined that the chat histories 416 are not in Unicode, then at 508, the method will perform codeset conversion to unify the code sets. Next, the method will proceed to step 510 to perform language detection. However, If at 506 it is determined that the chat histories 416 are in Unicode, then the method will proceed directly to step 510 to perform language detection. As such the languages that are used in the contents of the chat histories 416 will be detected.

Next at 512, script detection will be performed. Then at 514, it is determined whether the content of the chat histories 416 have standard generalized markup language (SGML) tags. SGML is used for defining generalized markup languages for documents. If at 514 it is determined that the content of the chat histories 416 have standard generalized markup language (SGML) tags, then the method will proceed to step 516 to remove all standard generalized markup language (SGML) tags as needed. Then the method will proceed to step 518 to add a prefix language tag; add an application tag; and add other related tags into each record according to rules of the prefix Tag 532. If at 514 it is determined that the content of the chat histories 416 do not have standard generalized markup language (SGML) tags, then the method will proceed directly to step 518 to add the necessary tags into the record.

Next at 520 the content of the normalized chat histories 418 are sorted and the Chat History Aggregator (CHA) 208 may be utilized to aggregate all the normalized chat records 418 into the aggregated chat history record database (ACHRDB) 112.

Therefore, at 522, the different chat histories 416 are merged. Then at 524, it is determined whether there are any duplicate chat history records 416. If at 524 it is determined that there are duplicate chat history records 416, then at 526, the method will perform content deduplication where any duplicate content is removed. Then, the method will proceed to step 528 to sort the merged history. However, if at 524 it is determined that there are not any duplicate chat history records 416, then the method will proceed directly to step 528 to perform the sorting of the merged history.

Next at 530, the merged chat history is saved in an aggregated chat history database (ACHRDB) 112 where it may be retrieved by the chat history retrieve engine 210. Therefore, the merged chat history (in its integrated unified format) may be stored in an indexed storage in the ACHRDB 112. As previously described, the Chat Content Search Engine (CCSE) 210 is an enhanced chat history search engine supported by the aggregated chat history record database (ACHRDB) 112 that may retrieve chat histories 416 based on input keywords 424 (FIG. 4). For example, after input keywords 424 (FIG. 4) are entered by a user 402 (FIG. 4), the Personal Communication Data Manager 116A, 116B (FIG. 1) may submit a chat history retrieval query 426 (FIG. 4) to the CCSE 210. Then, the CCSE 210 may retrieve chat histories 416 based on the input keywords 424 (FIG. 4) and provide searched results 422 (FIG. 4) to the user 402 (FIG. 4).

Additionally, according to at least one implementation, the user may access the merged chat history (in its integrated unified format) via the Chat History Manager Interface (CHMI) 202 (FIG. 2). Therefore, as previously described, the user may perform operations on the merged chat history (in its integrated unified format) such as updating the chat history; backing up the chat history; listing the chat history; deleting the chat history; categorizing the chat history; summarizing the chat history; and searching the chat history.

It may be appreciated that FIG. 5 provides only an illustration of one implementation and does not imply any limitations with regard to how different embodiments may be implemented. Many modifications to the depicted environments may be made based on design and implementation requirements. For example, the present embodiment may enable a user to manage data communications that were created in different chat applications, whether they were created in the same language or multiple languages.

Figure 6:
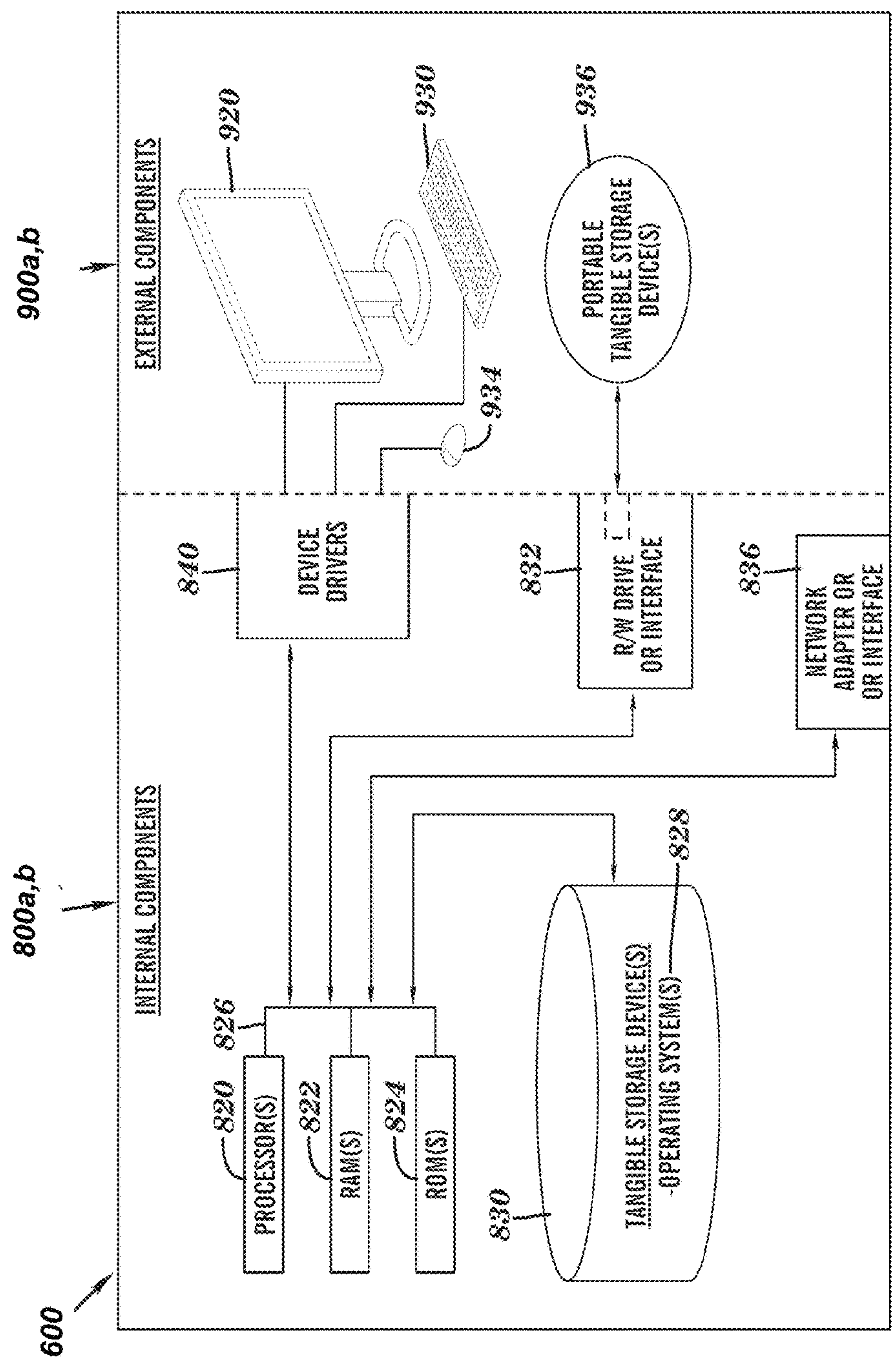
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102A, 102B (FIG. 1) and network server 114 (FIG. 1) may include respective sets of internal components 800 *a,b* and external components 900 *a,b* illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Personal Communication Data Manager 116A (FIG. 1) in client computer 102A, 102B (FIG. 1) and the Personal Communication Data Manager 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Personal Communication Data Manager 116A, 116B (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Personal Communication Data Manager 116A (FIG. 1) in client computer 102A, 102B (FIG. 1) and the Personal Communication Data Manager 116B (FIG. 1) in network server 114 (FIG. 1) can be downloaded to client computer 102A, 102B (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Personal Communication Data Manager 116A (FIG. 1) in client computer 102A, 102B (FIG. 1) and the Personal Communication Data Manager 116B (FIG. 1) (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
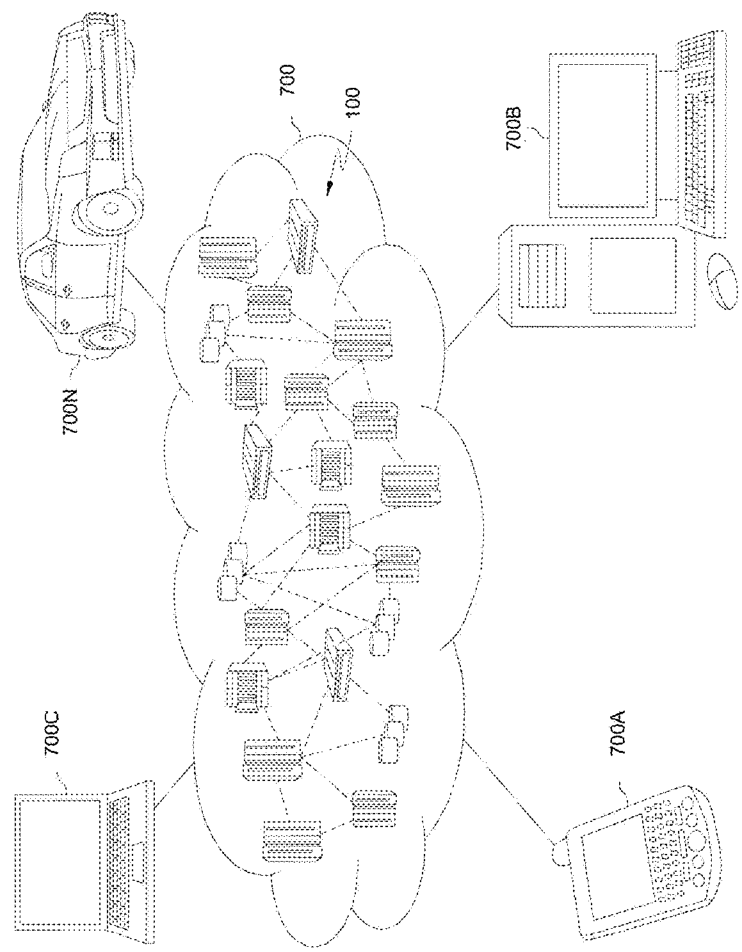
FIG. 7 is a block diagram of an illustrative cloud computing environment including the computer system depicted in FIG. 1, in accordance with an embodiment of the present disclosure.

Referring now to FIG. 7, illustrative cloud computing environment 700 is depicted. As shown, cloud computing environment 700 comprises one or more cloud computing nodes 100 with which local computing devices used by cloud consumers, such as, for example, personal digital assistant (PDA) or cellular telephone 700A, desktop computer 700B, laptop computer 700C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that computing nodes 100 and cloud computing environment 700 can communicate with any type of computerized device over any type of network and/or network addressable connection (e.g., using a web browser).

Figure 8:
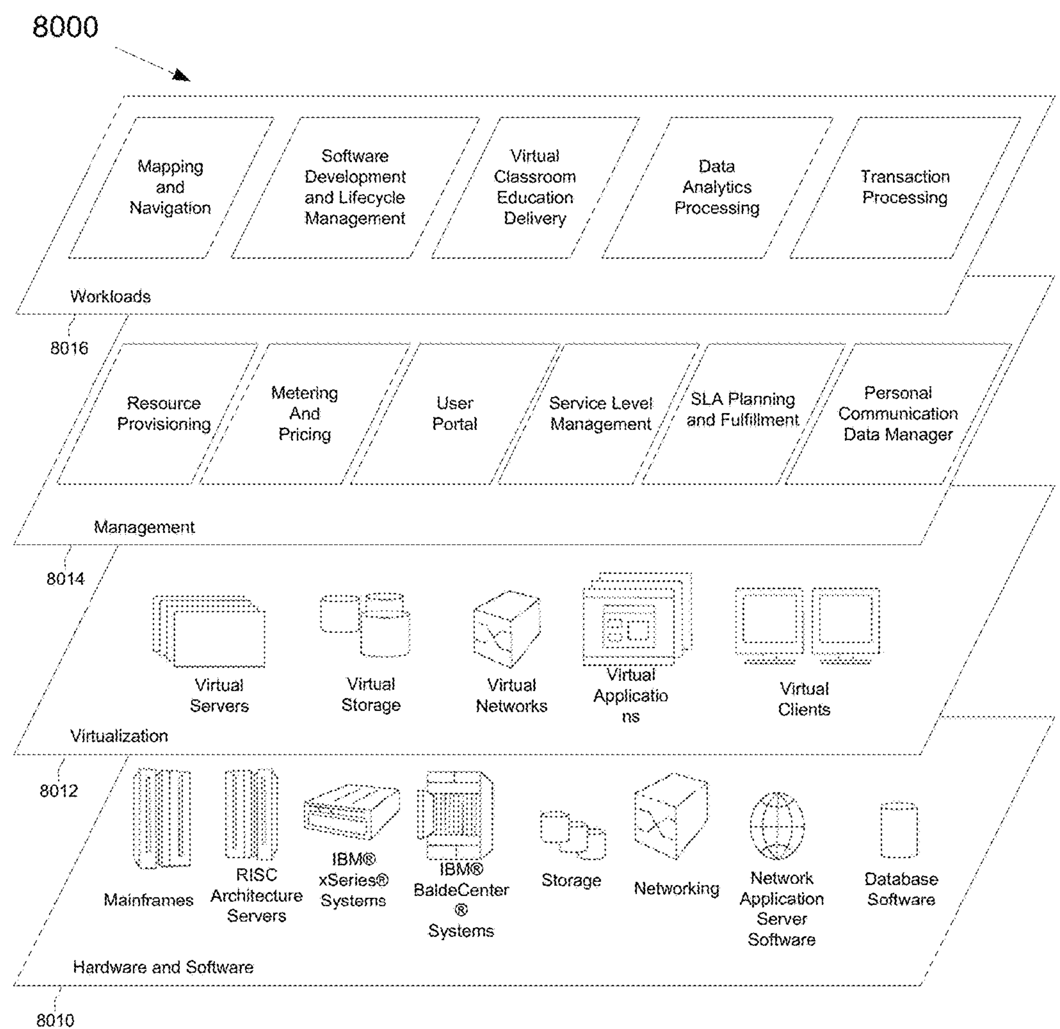
FIG. 8 is a block diagram of functional layers of the illustrative cloud computing environment of FIG. 7, in accordance with an embodiment of the present disclosure.

Referring now to FIG. 8, a set of functional abstraction layers 8000 provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 8010 includes hardware and software components. Examples of hardware components include: mainframes; RISC (Reduced Instruction Set Computer) architecture based servers; storage devices; networks and networking components. In some embodiments, software components include network application server software.

Virtualization layer 8012 provides an abstraction layer from which the following examples of virtual entities may be provided: virtual servers; virtual storage; virtual networks, including virtual private networks; virtual applications and operating systems; and virtual clients.

In one example, management layer 8014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA. A Personal Communication Data Manager may manage personal communication data in a multilingual mobile device. For example, a Personal Communication Data Manager may provide a history search feature to allow users to retrieve a chat history that has occurred in other PCAs and different languages.

Workloads layer 8016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for managing personal communication data, wherein the personal communication data comprises a plurality of chat histories from a plurality of chat applications, the method comprising:

converting, by a processor, a first chat history from a first application and a second chat history from a second application into an integrated unified format, wherein the second application is different from the first application and the first chat history is in a different language than the second chat history, and wherein converting the first chat history and the second chat history into an integrated unified format comprises:

decoding encoded portions of the first chat history and the second chat history to a unified code set;

determining if a duplicate chat history exists between the first chat history and the second chat history; and in response to determining the duplicate chat history exists, performing content deduplication to delete a plurality of duplicate content between the first chat history and the second chat history;

storing the integrated unified format into an indexed storage;

providing a user interface (UI) to access the integrated unified format via the indexed storage;

receiving a plurality of predefined integrating rules;

monitoring a plurality of chat events associated with the first application and the second application, wherein the monitoring of the plurality of chat events occurs and in place of the plurality of chat events being stored as the first chat history associated with the first application or as a second chat history associated with the second application;

aggregating the monitored plurality of chat events based on the received integrating rules;

converting the aggregated monitored plurality of chat events into the integrated unified format;

storing the converted monitored plurality of chat events in the indexed storage;

receiving a chat history retrieval query to retrieve a subset of the stored plurality of chat events from the indexed storage, wherein the received chat history retrieval query comprises a plurality of input keywords entered via the provided UI;

searching the indexed storage for the subset of the monitored plurality of chat events, wherein searching the indexed storage comprises searching the subset of the monitored plurality of chat events for a plurality of chat histories that matches the entered plurality of input keywords;

retrieving the plurality of chat histories that matches the entered plurality of input keywords from the indexed storage based on the plurality of chat histories matching the entered plurality of input keywords; and displaying the retrieved plurality of chat histories via the UI.

2. The method of claim 1, wherein the converting the first chat history and the second chat history into the integrated format further comprises:

normalizing the first chat history and the second chat history.

3. The method of claim 2, wherein normalizing the first chat history and the second chat history further comprises:

decoding a plurality of chat contents associated with the first chat history and a plurality of chat contents associated with the second chat history;

unifying a plurality of code sets associated with the first chat history and a plurality of code sets associated with the second chat history;

detecting a language associated with the first chat history and a language associated with the second chat history;

removing a plurality of standard generalized markup language (SGML) tags associated with the first chat history and a plurality of standard generalized markup language (SGML) tags associated with the second chat history; and adding at least one prefix language tag associated with the first chat history and at least one prefix language tag associated with the second chat history.

4. The method of claim 1, wherein the accessing the integrated unified format comprises at least one of updating the integrated unified format; backing up the integrated unified format; listing the integrated unified format; deleting the integrated unified format; categorizing the integrated unified format; summarizing the integrated unified format; and searching the integrated unified format.

5. The method of claim 1, wherein the user interface (UI) supports at least one option comprising tagging the integrated unified format by language; sorting the integrated unified format by language; and searching the integrated unified format by language.

6. The method of claim 1, wherein the indexed storage comprises a plurality of language tags and a plurality of application identifications (IDs).

* * * * *